United States Patent [19]
Kahle et al.

[11] Patent Number: 5,535,943
[45] Date of Patent: Jul. 16, 1996

[54] TEMPERATURE-REGULATED MIXING VALVE

[75] Inventors: Dieter Kahle, Iserlohn; Eberhard Stolle, Hagen; Walter Schutzeichel, Menden, all of Germany

[73] Assignee: Friedrich Grohe Aktiengesellschaft, Hemer, Germany

[21] Appl. No.: 303,573

[22] Filed: Sep. 8, 1994

Related U.S. Application Data

[63] Continuation of Ser. No. 167,244, Dec. 15, 1993, abandoned.

[30] Foreign Application Priority Data

Jan. 7, 1993 [DE] Germany ............... 43 00 183.1

[51] Int. Cl.⁶ .................................................. G05D 23/13
[52] U.S. Cl. ......................................... 236/12.2; 137/625.4
[58] Field of Search ............................ 236/12.21, 12.22, 236/12.2; 137/625.4

[56] References Cited

U.S. PATENT DOCUMENTS

| | | | |
|---|---|---|---|
| 4,607,788 | 8/1986 | Bendall et al. | 236/12.21 X |
| 4,687,025 | 8/1987 | Kahle | 137/625.17 |
| 4,767,052 | 8/1988 | Kostorz | 236/12.22 |
| 5,340,018 | 8/1994 | MacDonald | 236/12.2 |

FOREIGN PATENT DOCUMENTS

| | | |
|---|---|---|
| 156122 | 10/1985 | European Pat. Off. . |
| 232454 | 8/1986 | European Pat. Off. . |
| 196000 | 10/1986 | European Pat. Off. . |
| 0232454 | 3/1989 | European Pat. Off. . |
| 0196000 | 1/1990 | European Pat. Off. . |
| 560737 | 9/1993 | European Pat. Off. . |
| 3612988 | 10/1987 | Germany . |
| 2253680 | 9/1992 | United Kingdom . |

Primary Examiner—William E. Tapolcai
Attorney, Agent, or Firm—Herbert Dubno; Andrew Wilford

[57] ABSTRACT

A valve assembly has a valve housing having hot- and cold-water inlet ports and a mixed-water outlet port and a valve disk fixed in the housing, centered on an axis, and having a face formed with respective arcuate hot- and cold-water grooves offset diametrically opposite to each other relative to the axis, each aligned with and receiving flow from the respective inlet port, and having centers of curvature at the axis, a is also formed with a central throughgoing outlet opening. A movable valve disk sitting flat on the face of the fixed valve disk is formed with a pair of axially throughgoing arcuate openings offset diametrically opposite to each other and having centers of curvature at the axis and is also formed with a central throughgoing outlet opening aligned with the outlet opening of the fixed disk. The openings and grooves each have an arc length of less than 90°. A splitter element in the housing forms a pair of passages each having a pair of ends one of which is at a respective one of the openings of the movable disk. A coupling element pivotal in the housing about the axis turns the movable disk on the fixed disk and thereby restricts flow from the grooves to the respective arcuate openings. A thermostatically controlled valve element positioned between the other ends of the passages and the outlet opening balances flow from the passages to the outlet opening in accordance with temperature in the outlet openings.

15 Claims, 8 Drawing Sheets

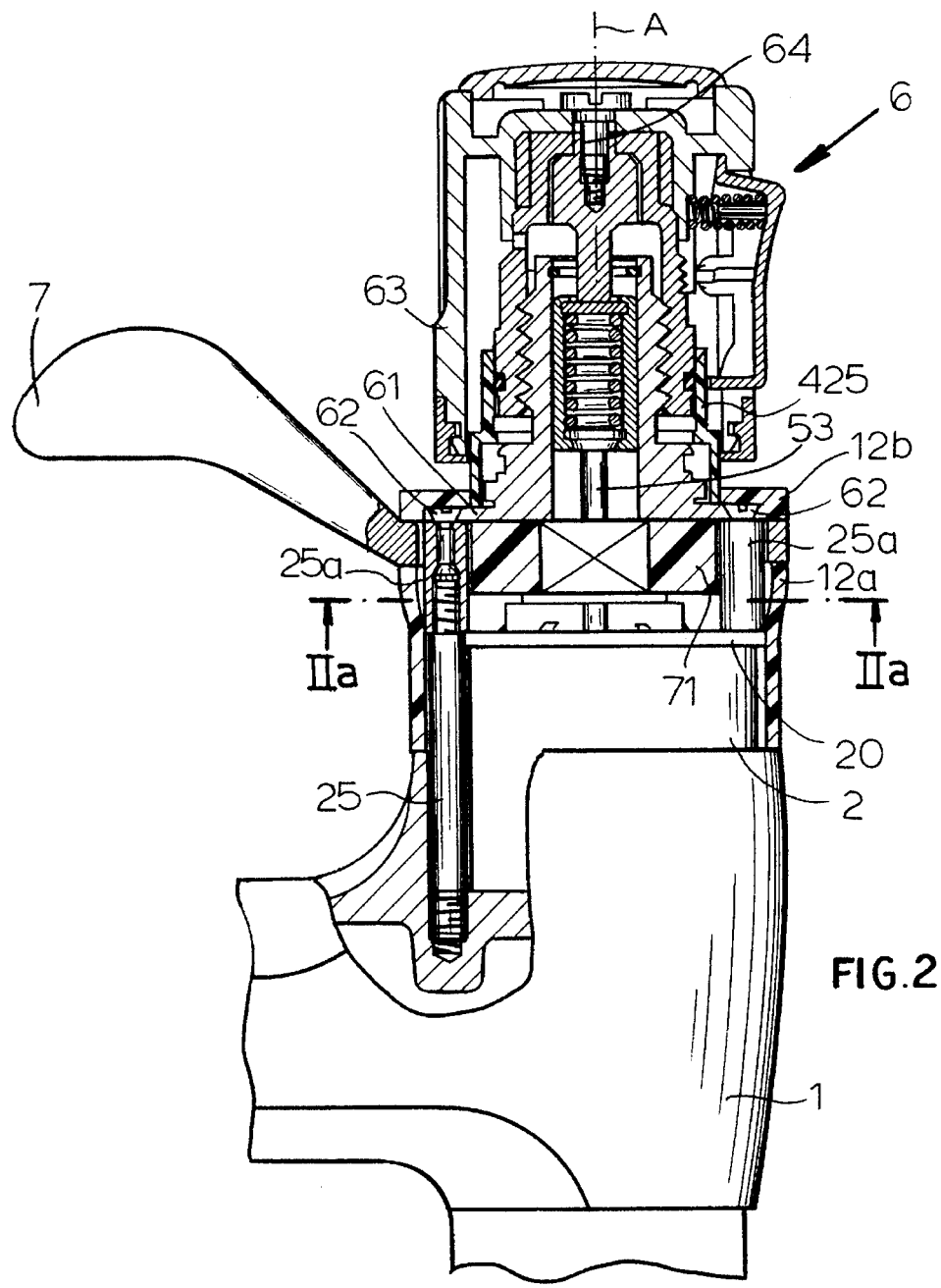
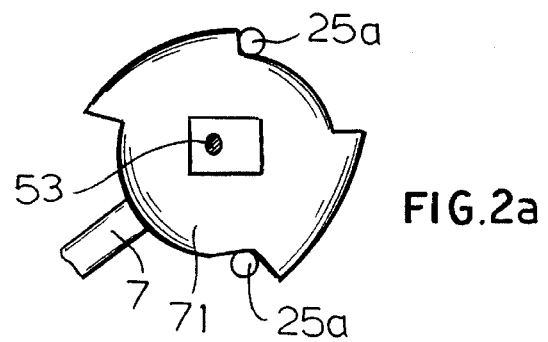
FIG.2
FIG.2a

TEMPERATURE-REGULATED MIXING VALVE

CROSS REFERENCE TO RELATED APPLICATIONS

This application is a file-wrapper-continuation of application Ser. No. 08/167,244 filed 15, Dec. 1993, now abandoned, with a claim to the priority of German application P 43 00 183.1 filed 7 Jan. 1993.

FIELD OF THE INVENTION

The present invention relates to a mixing valve. More particularly this invention concerns such a valve that is also automatically temperature regulated.

BACKGROUND OF THE INVENTION

German patent document 3,530,812 and equivalent European patent 232,454 of J. R. Kostorz describe a thermostatic mixing valve intended for domestic bathroom use and that has a housing formed with separate hot- and cold-water input connections and with a tempered-water output connection typically carrying a faucet. A valve body in the housing can move between full-cold and full-hot end positions to admit hot and cold water in different ratios, depending on the desired setting which itself is established by an adjustment knob or lever. A thermostat, which term here means a device capable of changing position or shape dependent on temperature, can act on the valve body to move it so as to keep the temperature of the water downstream of the valve body constant. Normally this thermostat is braced by a return spring with the valve body against the temperature-setting device.

An improvement on this device is described in commonly owned U.S. Pat. No. 4,767,052 of J. R. Kostorz and D. Kahle. It also has hot- and cold-water inlets respectively connectable to pressurized hot- and cold-water lines and also has an outlet. Its housing is formed with respective compartments connected to the inlets and outlet and with hot- and cold-water seats bounding the respective inlet compartments. A valve body is displaceable axially in the housing between one end position engaging the hot-water seat, blocking flow from the hot-water inlet compartment to the outlet compartment, out of engagement with the cold-water seat, and permitting flow from the cold-water inlet compartment to the outlet compartment and an opposite end position engaging the cold-water seat, blocking flow from the cold-water inlet compartment to the outlet compartment, out of engagement with the hot-water seat, and permitting flow from the hot-water inlet compartment to the outlet compartment. On moving between these end positions the valve body passes through intermediate positions permitting flow from both inlet compartments past the respective seats into the outlet compartment. A fitting body fixed in the housing and defining a wall of the outlet compartment is formed with a throughgoing hole opening into the outlet compartment. A thermostat in the outlet compartment is fixed with the valve body to a tubular stem engaged through and limitedly axially movable in the hole of the fitting body. A seal ring engages around the stem to seal the hole and a spring is braced between the housing and the stem outside the outlet compartment to pull the thermostat and valve body into solid engagement with the fitting body. A temperature-selecting mechanism engages via the stem with the thermostat and operatively engages via the thermostat with the valve body.

Other single-control mixing valves are known, for example from European patent 196,000 filed by J. Humpert and M. Pawelzik with a claim to the priority of German 3,510,835 filed 26, Mar. 1985 (see also related U.S. Pat. No. 4,687,925). Such a mixing valve has a base plate adapted to be fixedly mounted on a base fitting, a sleeve centered on an axis, having a lower end rotatably mounted on the base plate for rotation about the axis, having an internally threaded upper end, and formed with a radially open window, a stationary valve plate fixed on the base plate inside the sleeve and formed with at least two incoming liquid ports and one outgoing liquid port spaced therefrom, and a movable valve plate flatly sitting on the stationary plate inside the sleeve and formed with a chamber alignable with the ports therein. The movable plate being angularly and radially displaceable relative to the axis so the chamber variously overlaps and interconnects the ports. A control member is fixed inside the sleeve to the movable valve plate A holddown ring threaded in the upper sleeve end bears axially downward on the member and valve plates and a control lever has an inner end separately pivoted on the control member and on the sleeve about respective pivot axes perpendicular to the axis of rotation of the sleeve and an outer end projecting radially from the sleeve through the window. A housing part engaged in the sleeve axially between the holddown ring and the control member is provided with an extension fitting snugly in the window and a pivot carrying the inner end of the control lever.

OBJECTS OF THE INVENTION

It is therefore an object of the present invention to provide an improved mixing valve.

Another object is the provision of such an improved mixing valve which overcomes the above-given disadvantages, that is which is built basically like the above described single-lever valves, but which has automatic temperature regulation.

A further object is to provide a very compact automatic temperature-regulating valve which has single-lever control of flow volume.

Yet another object is to provide an improved valve core that can be used as a replacement in an existing single-control valve to provide automatic temperature regulation.

SUMMARY OF THE INVENTION

A valve assembly has according to the invention a valve housing having hot- and cold-water inlet ports and a mixed-water outlet port and a valve disk fixed in the housing, centered on an axis, and having a face formed with respective arcuate hot- and cold-water grooves offset diametrically opposite to each other relative to the axis, each aligned with and receiving flow from the respective inlet port, and having centers of curvature at the axis, and also formed with a central throughgoing outlet opening. A movable valve disk sitting flat on the face of the fixed valve disk is formed with a pair of axially throughgoing arcuate openings offset diametrically opposite to each other and having centers of curvature at the axis and is also formed with a central throughgoing outlet opening aligned with the outlet opening of the fixed disk. The openings and grooves each have an arc length of less than 90°. A splitter element in the housing forms a pair of passages each having a pair of ends one of which is at a respective one of the openings of the movable disk. A coupling element pivotal in the housing about the axis turns the movable disk on the fixed disk and thereby restricts flow from the grooves to the respective arcuate openings. A thermostatically controlled valve element positioned between the other ends of the passages and the outlet opening balances flow from the passages to the outlet opening in accordance with temperature in the outlet openings.

This arrangement allows a mixing valve to be automatically thermostatically controlled, while still having a lever for flow-volume control. The core of the valve can replace the core of a standard single-control valve such as described in above cited EP 196,000 without thermostatic control. The same outside housing can be employed for this new-style valve.

According to the invention the grooves of the fixed disk have circularly arcuate inner and outer edges and are of a predetermined relatively large width between the respective edges. The openings are of a narrow width at most equal to half of the large width and are differently radially offset from the axis with one of the openings lying on the outer edge of one of the grooves and the other opening lying on the inner edge of the other groove. The splitter element includes an eccentric sleeve having an eccentric rim bearing on the movable valve disk with one of the openings radially outside the rim and the other opening radially inside the rim. The splitter element is symmetrical about a plane including the axis and mountable in the coupling element in either of two 180° offset positions. Thus if the hookup is reversed, the valve can be made to work correctly simply by turning around the splitter element. A spring presses the element rim axially against the movable valve disk and the spring is a washer having an inner periphery forming a valve seat for the valve element.

In accordance with further features of the invention a cartridge housing containing the disks and elements has a bottom side at which the fixed disk is exposed and a top side. The thermostatically controlled valve element has an axially displaceable control stem projecting axially from the top side of the cartridge housing. The coupling element is rotationally fixed to the movable valve disk and has a polygonal-section stem projecting axially out of the cartridge housing. The valve further has according to the invention a lever fixed on the stem and projecting nonaxially out of the valve housing. In addition the thermostatically controlled valve element comprises a thermostat and an actuating stem projecting axially and on the axis through the stem of the coupling element. The valve element is provided with a spring biasing the actuating stem against the thermostat.

In fact according to this invention the splitter element forms at least one of a pair of axially spaced valve seats for the valve element. A temperature-selector mechanism is secured axially atop the cartridge housing by bolts seated in the valve housing and also securing the cartridge housing in place. The temperature-selector mechanism has a flange and the bolts include nuts bracing the flange on the cartridge housing.

The coupling element in accordance with this invention is rotationally fixed to the movable valve disk and has a polygonal-section stem projecting axially out of the cartridge housing. The valve further has according to the invention a lever fixed on the stem and projecting nonaxially out of the valve housing and stops angularly fixed on the lever, angularly engageable with the bolts, and limiting angular movement of the lever relative to the valve housing to at most 90°. The housing includes a pair of skirts axially flanking the lever. The fixed disk has a lower face opposite the face formed with the grooves and is formed with respective passages opening at the lower face at the inlet ports and also opening into the respective grooves. Furthermore the movable valve disk has a raised annular collar defining the respective inlet port and having an edge defining a seat for the valve element and the openings and grooves each have an arc length of about 70°.

BRIEF DESCRIPTION OF THE DRAWING

The above and other objects, features, and advantages will become more readily apparent from the following description, reference being made to the accompanying drawing in which:

FIG. 2 is a larger-scale view partly in section of a detail of the valve assembly;

FIG. 2a is a section taken along line IIa—IIa of FIG. 2;

SPECIFIC DESCRIPTION

Figure 1:
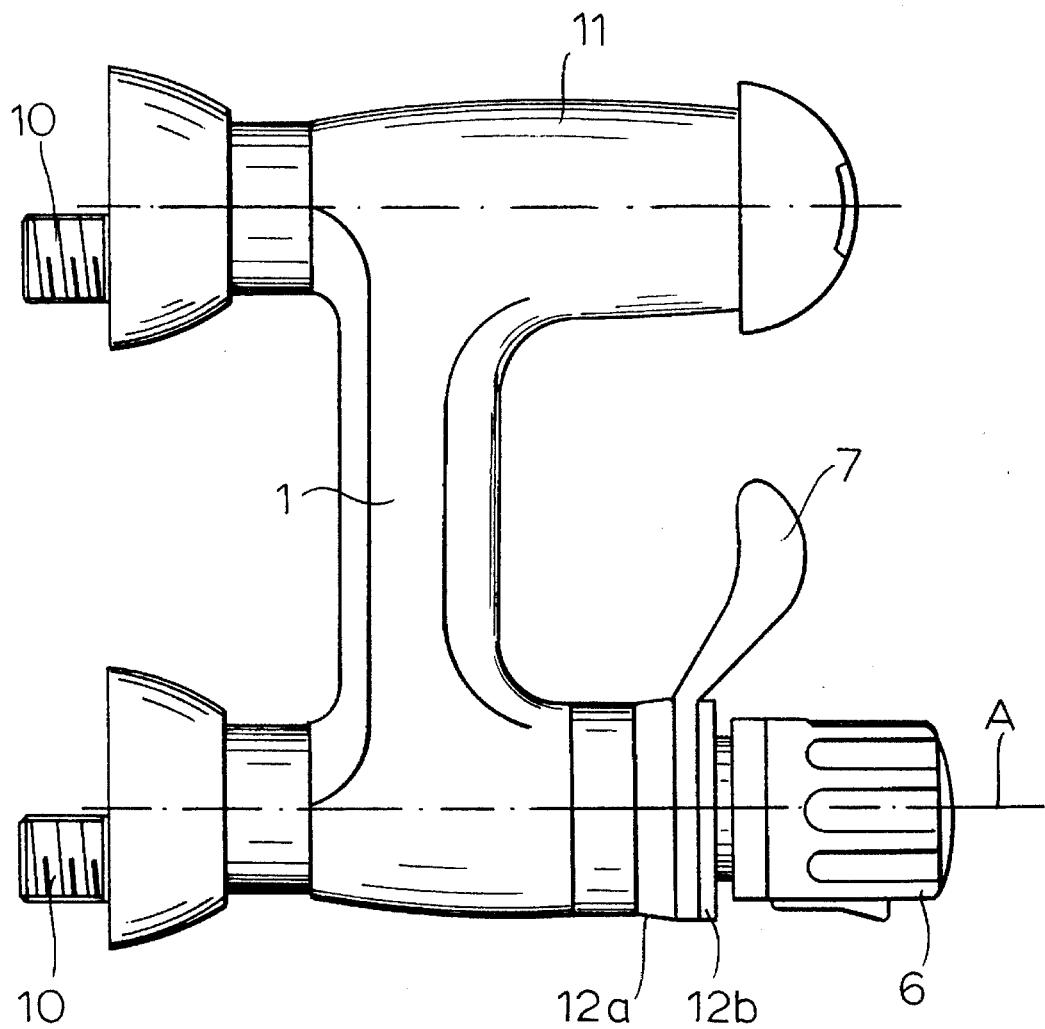
FIG. 1 is a small-scale side view of the mixing-valve assembly of this invention.

As seen in FIGS. 1 and 2 a mixing-valve assembly according to this invention has an H-shaped housing 1 formed on its back side with hot- and cold-water connections 10, and having on its front side an outlet or faucet 11 and, coaxial with respect to an axis A, a temperature-control knob 6 and a volume-control lever 7. On the housing 1 is a temperature selector 6 corresponding generally to the structure of above-cited European 232,454 and having a knob 64 secured in place by a screw 62. This selector 6 has on its bottom side a radially outwardly projecting flange 61 that is pressed by screws 62 to threaded nut sleeves 25a screwed on the upper ends of two diametrically opposite bolts 25 fixed in the housing 1. The sleeves 25a in turn press down on a disk 20 of a flow-control cartridge 2 to press it down onto the housing. A ring 71 fixed to the lever 7 is limitedly pivotal about the axis A on the housing 1 which has annular shields or covers 12a and 12b flanking this lever 7. Stops 72 (see FIG. 2a) on the ring 71 engage the sleeves 25a to limit rotation of the lever 7 to 90°. The temperature selector 6 has a stem 53 extending along and displaceable parallel to the axis A and operating a mixing valve 5.

Flow or volume is controlled by a fixed valve disk 3 seated on a bottom wall 2a of the cartridge 2 and a movable disk 4 coupled rotationally to a coupling sleeve 42 and sitting atop the fixed disk 3. The bottom wall 2a is formed with cold- and hot-water inlet ports 21a and 21b spaced angularly from each other by about 90° and offset from the axis A, and an outlet port 22 centered on the axis A and surrounded on the lower surface of the wall 2a by a seal ring 26 engageable with an unillustrated surface of the housing 1. Unillustrated passages in the housing 1 lead from the inlet fittings 10 to ports aligned with the ports 21a and 21b and from the outlet port 22 to the faucet 11.

Figure 4:
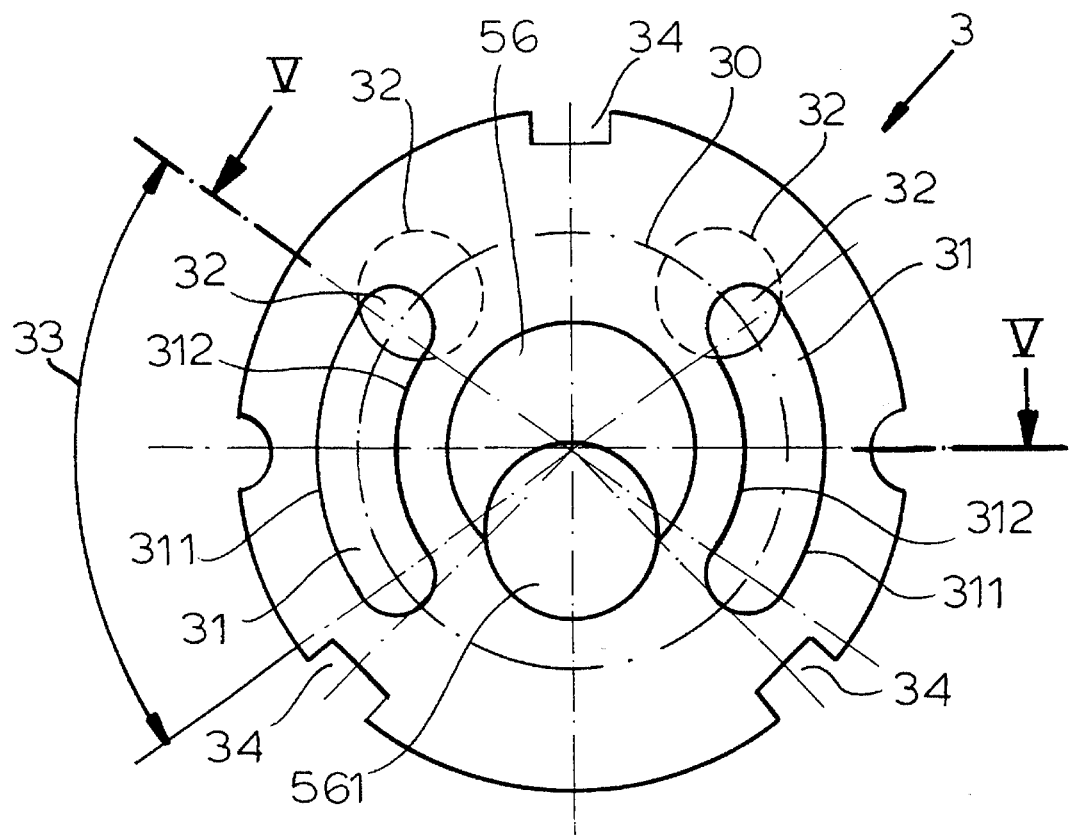
FIG. 4 is a top view of the fixed valve plate of the assembly.
Figure 5:
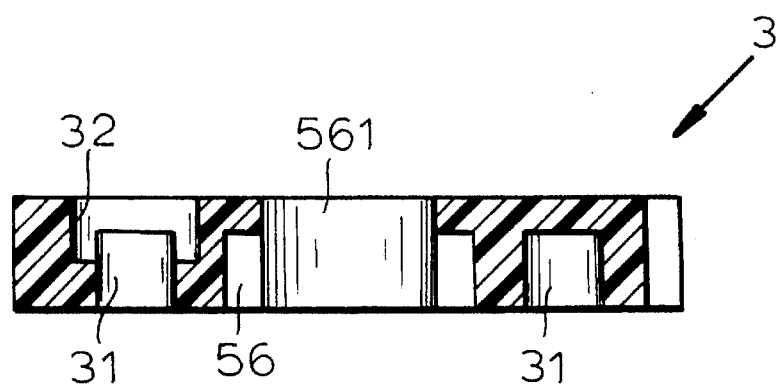
FIG. 5 is a section taken along line V—V of FIG. 4.

As best seen in FIGS. 4 and 5 the fixed disk 3 is formed with a pair of upwardly open arcuate grooves 31 each having an arc length 33 of 70°, of the same width, and both centered on a circle 30 centered on the axis A. At one end of each groove 31 is a hole 32 that opens to the respective inlet port 21a or 21b. The outer periphery of the disk 3 is formed with radially outwardly open notches 34 that fit with complementary formations of the housing 1 to rotationally arrest it therein. Centrally the disk 3 is formed with an upwardly open pocket 56 forming an outlet compartment and communicating via a passage 561 with the outlet port 22 of the wall 2a. Outer and inner edges 311 and 312 of the identical grooves 31 are equispaced from the circle 30.

Figure 6:
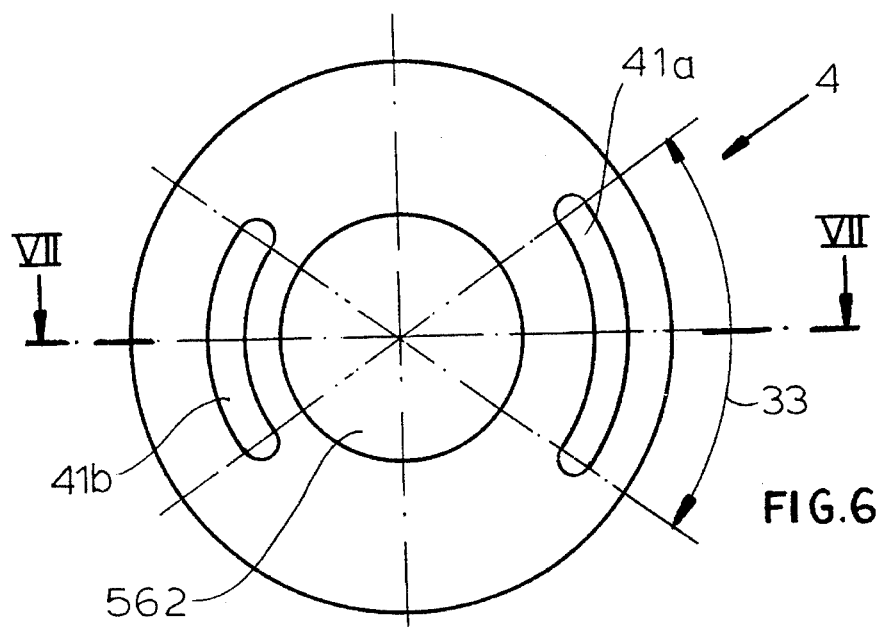
FIG. 6 is a bottom view of the movable valve plate of the assembly.
Figure 7:
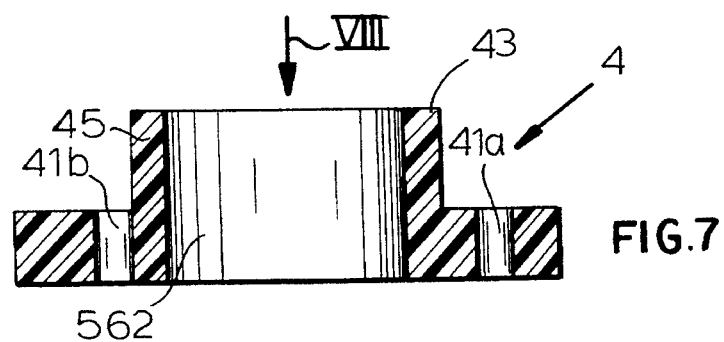
FIG. 7 is a section taken along line VII—VII of FIG. 6.
Figure 8:
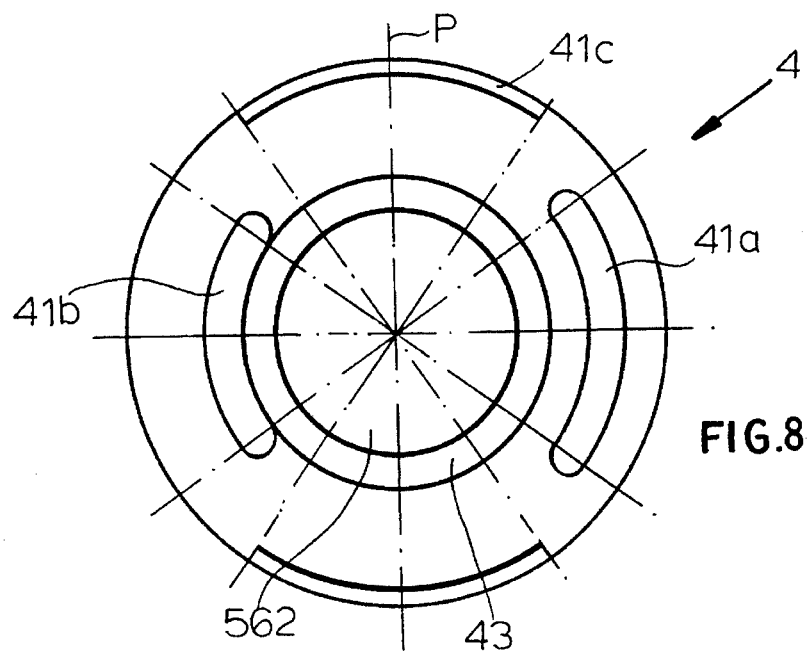
FIG. 8 is a top view taken in the direction of arrow VIII of FIG. 7.
Figure 9A:
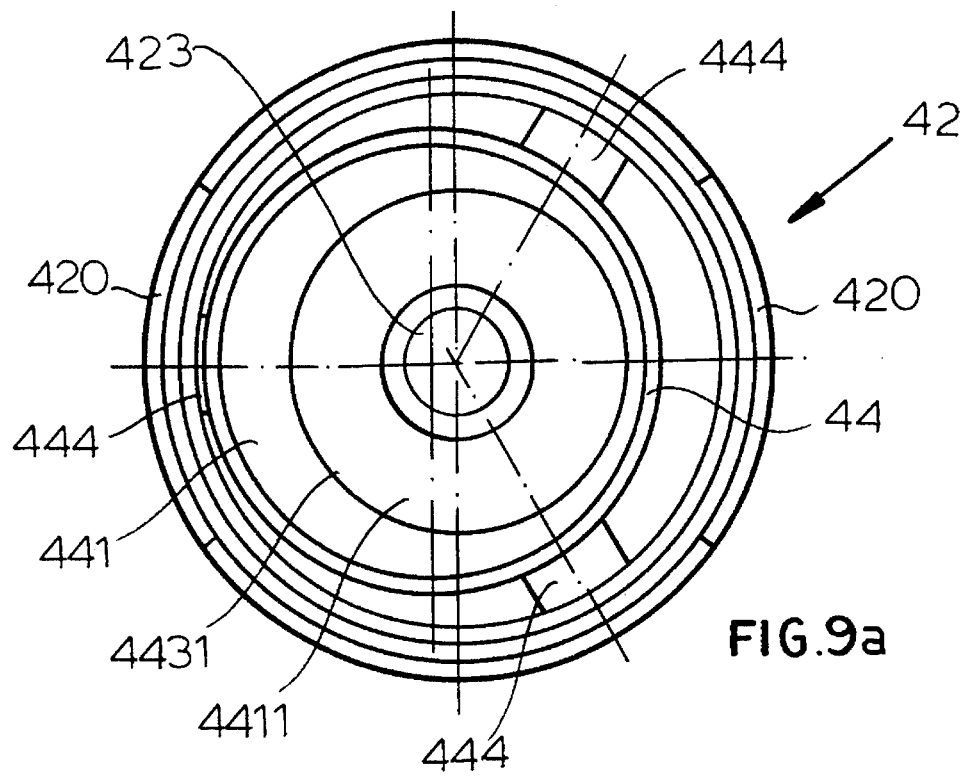
FIG. 9a is a bottom view taken in the direction of arrow IXa of FIG. 9.
Figure 9:
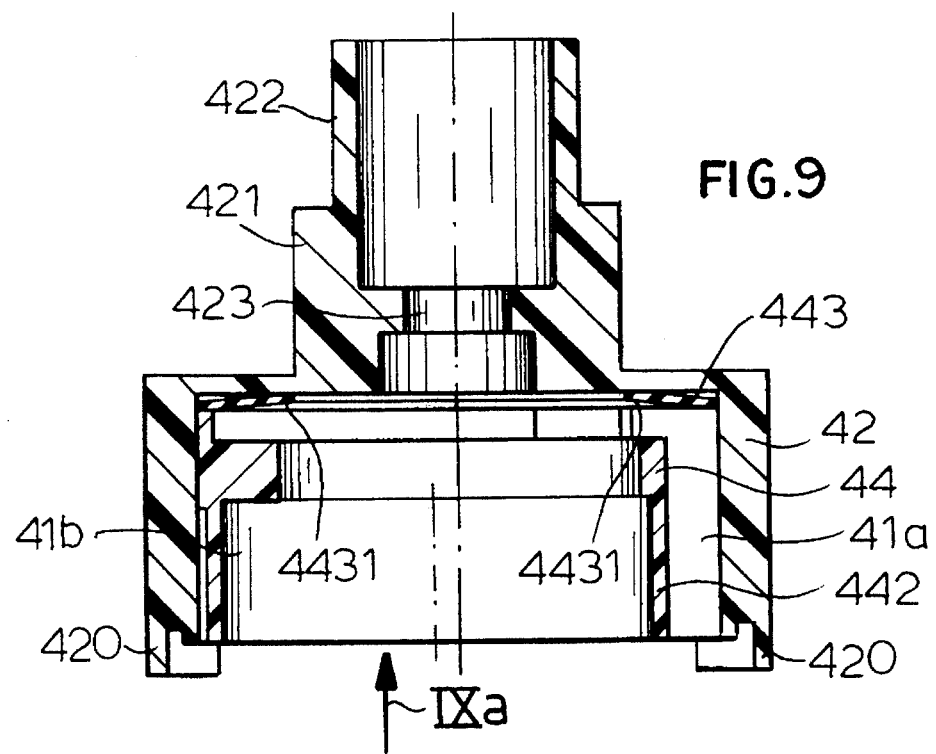
FIG. 9 is an axial section through the coupling elements of the valve assembly.
Figure 10:
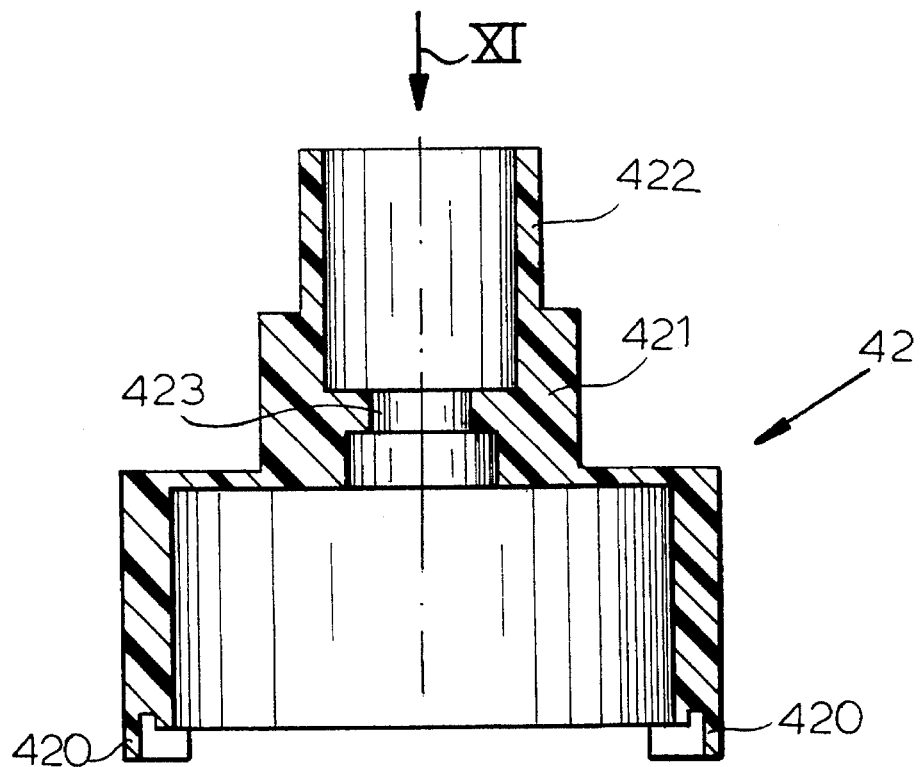
FIG. 10 is an axial section through the coupling sleeve.
Figure 11:
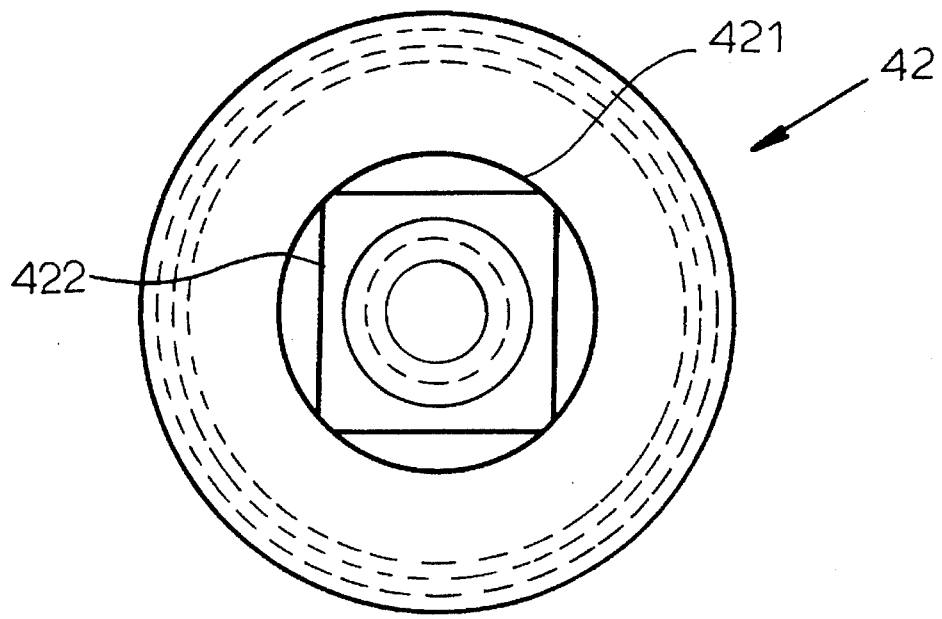
FIG. 11 is a top view taken in the direction of arrow XI of FIG. 10.
Figure 13:
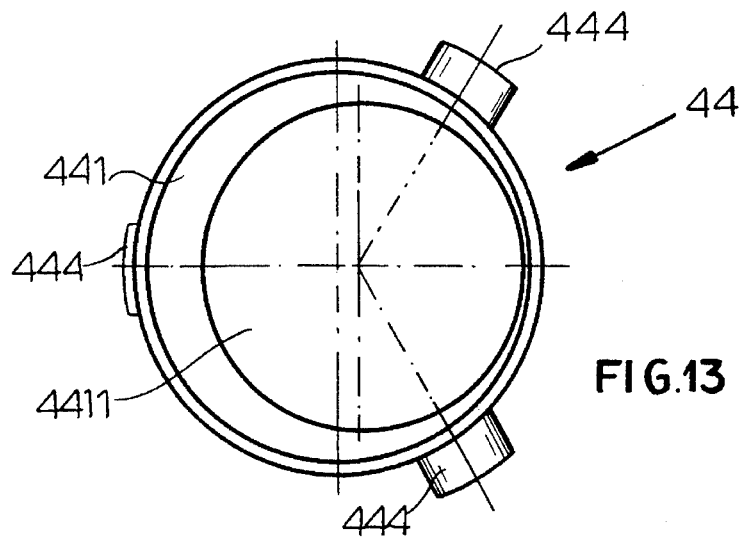
FIGS. 13 and 14 are bottom and top views taken in the directions of respective arrows XIII and XIV of FIG. 12.
Figure 12:
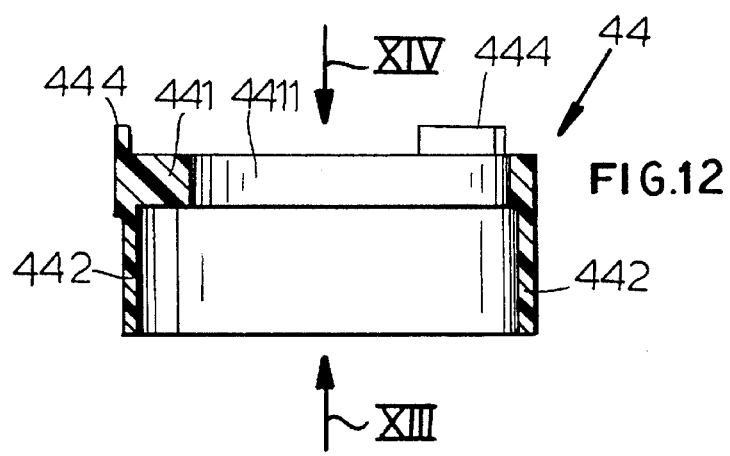
FIG. 12 is an axial section through the flow-splitting sleeve.
Figure 14:
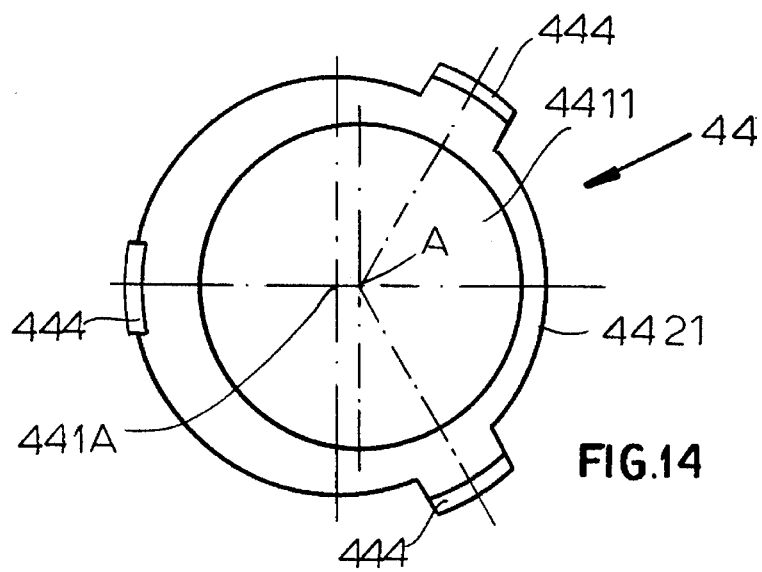

The movable disk 4 shown in FIGS. 6, 7, and 8 is formed with two slots 41a and 41b of the same arc length 33 as the slots 31, but of different rectified lengths because they are differently spaced from the axis A. The slots 41a and 41b are of a radial width that is at most half of that of the slots 31 and the outer edge of the slot 41a is of the same radius of curvature and spacing from the axis A as the outer edges 311 and the inner edge of the slot 41b is similarly of the same radius of curvature and spacing from the axis A as the inner edges 312. Centrally the disk 4 is formed with a cylindrical hole 562 alignable with the outlet pocket 56 of the disk 3. Furthermore the disk 4 has an axially centered upstanding collar 45 having an upper edge or rim 43. Axially upwardly and radially outwardly open notches 41c are formed on the disk 4.

The coupling sleeve 42 shown in FIGS. 9, 9a, 10, and 11 is of stepped cylindrical shape and has at its lower edge a pair of diametrically opposite and axially downwardly projecting teeth 420 that fit in the notches 41c to rotationally couple the sleeve 42 to the disk 4. A seal 443 on this lower edge engages an upper face of disk 4. The sleeve 42 further has a stem 421 formed with an axially extending central passage 423 through which the stem 53 passes, and the stem 421 has a square-section end 422 that fits complementarily in the lever disk 71 to rotationally couple this sleeve 42 to the lever 7.

Internally the coupling sleeve 43 accommodates a splitter element 44 formed as a cylindrical sleeve 442 having a web 441 whose axis 441A is offset from the valve axis A and which has an upper end formed as a web 441 with a cylindrical hole 4411 centered on the axis A. Radially outwardly projecting tabs or feet 444 accommodated in unillustrated axially extending and radially inwardly open grooves or seats of the housing 1 keep the axis 41a offset from the axis A and the center of the hole 4411 on the axis A. The cylindrical wall 442 has a portion 4421 that lies substantially on the circle 33. Thus the splitter element defines an outside compartment 24a into which the slot 41a opens and an inside compartment into which the slot 41b opens.

The disk 4 is symmetrical about an axial plane P so that it can be mounted in either of two 180°-offset positions on the sleeve 44. When in the illustrated position the slot 41a feeds liquid from the inlet port 21b to the outer compartment 24a and from the inlet port 21a to the inner compartment 24b. When reversed, flow is from the ports 21a and 21b to the compartments 24a and 24b, respectively. Thus if the plumber gets the hot- and cold-water lines backward, as happens occasionally, polarity can be corrected simply by reversing the disk 4.

The temperature-controlling valve 5 comprises a double valve element 51 movable by a thermostat 50 relative to the stem 53, having a seal 511 riding on the inner periphery of the hole 4411, and defining flow passages 54 and 55 respectively with the upper edge 23 and with an inner periphery 4431 of a spring washer 443 seated against a shoulder of the sleeve 42. The thermostat 50 is sealed by a ring 424 relative to the stem 421 and is biased upward against the stem 53 by a spring 52 braced downward against the stem 421 and upward against a nut 57 threaded onto the thermostat 50 to secure the valve 5 solidly in place. As is standard, the thermostat 50 responds to the temperature of the liquid in the outlet compartment 56, 562 and the axial position of the stem 53 to move the valve element 51 and thereby control the mix ratio of hot and cold water.

The above-described structure is put together as follows:

First the spring washer 443 is inserted into the coupling sleeve 42 and then the thermostat 50 with the double valve element 51 is inserted through the seal 424 and hole 423 of the stem 421 and from the other side the spring 52 and nut 57 are mounted in place. Thus the valve element 51 is urged by the spring 52 against the seat forming inner edge 4431 of the washer 443.

The eccentric splitter sleeve 44 is then inserted into the sleeve 42 so its hole 4411 fits over the seal 511 of the valve body 51. A seal ring 443 is then set in the edge of the rim 442 and the movable valve disk 4 is fitted to this rim 442 in the desired orientation so that the coupling feet 520 engage in the notches 41c. A low-friction slide ring 46 is fitted over the stem 421 and the assembly is inserted into the cartridge housing until it rests against the shoulder 23 thereof. The fixed disk 3 is then inserted into the bottom of the cartridge 2 and the bottom wall 2a is finally installed to complete the assembly of the valve core shown in FIG. 3.

This core is then inserted into the housing 1, if necessary after removal of an old-fashioned single-control core. The bolts 25 are screwed into place and then the core is slid over these bolts until it seats on the floor of the housing 1, with the ports 21a, 21b, and 22 aligning with the respective ports of the housing 1. The metal holddown disk 20 is then fitted over the cartridge 2 and the two sleeve nuts 25a are installed to lock the cartridge 2 tightly in place. The annular shield 12a and ring 7a are installed, along with the lever 7, and the flange 61 of the temperature selector 6 is seated atop these nuts 25a and secured in place by the screws 62. This couples the lever 7 to the sleeve 42 and brings the stem 53 into engagement with the thermostat 50. The cap 63 is then secured in place by its screw 64. The valve is complete.

Figure 3:
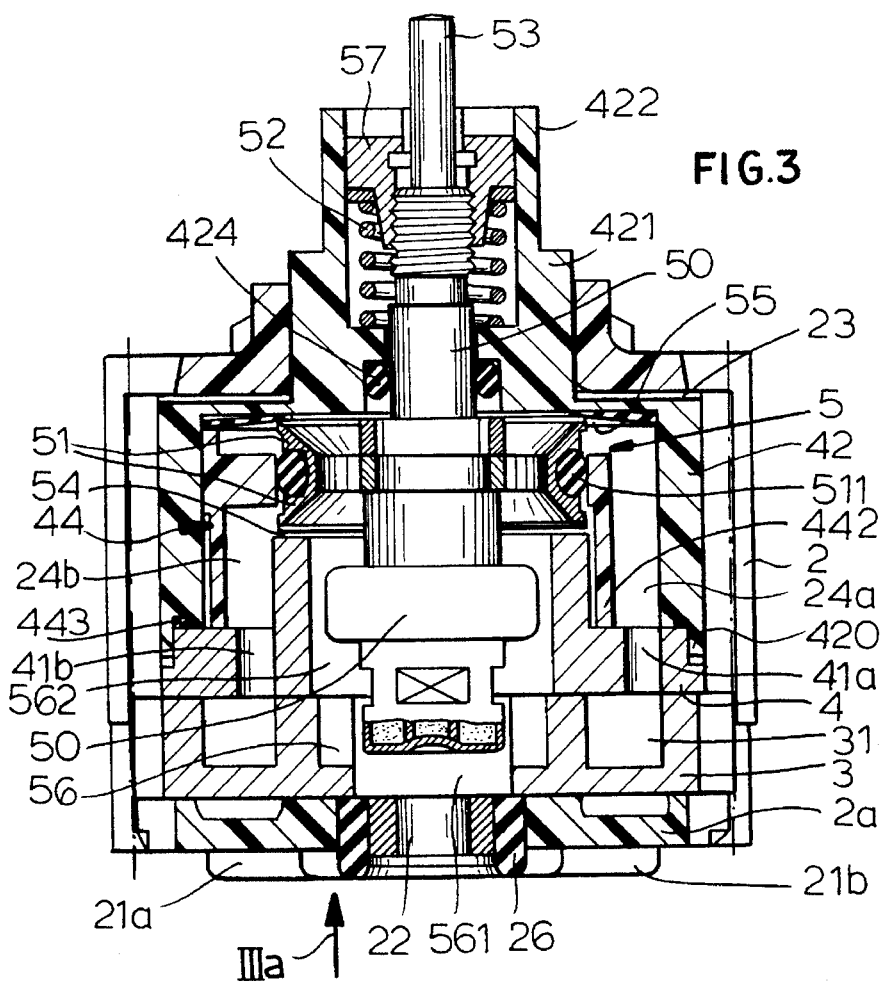
FIG. 3 is a yet larger-scale section through the flow-control cartridge of the valve assembly.
Figure 3A:
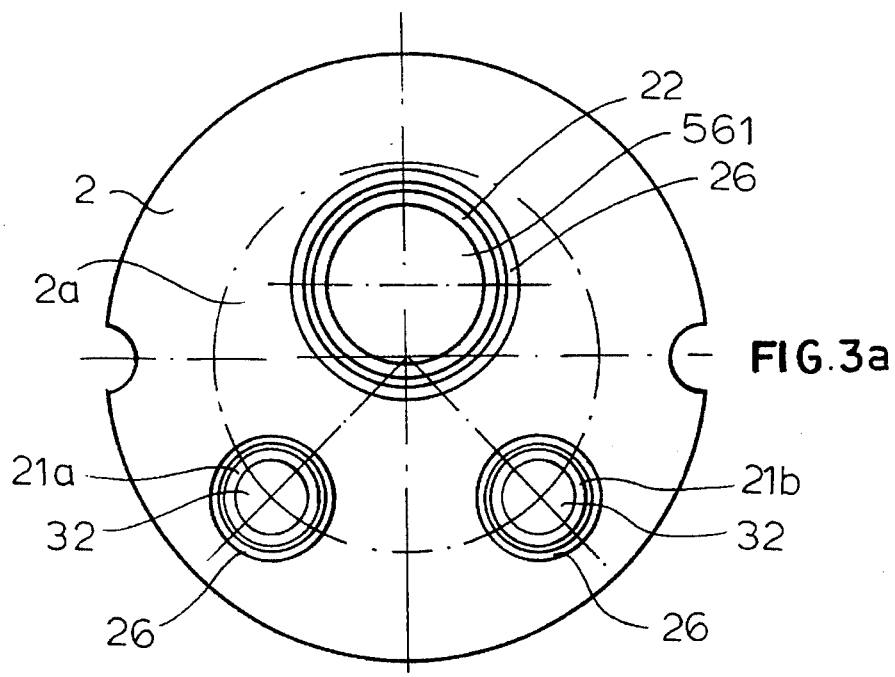
FIG. 3a is a bottom view taken in the direction of arrow IIIa of FIG. 3.

Such a valve is operated by setting (see above-mentioned EP 232,454) the knob 63 to the desired temperature, then turning the lever 7 for the desired amount of flow. FIG. 3 shows the maximum flow position. When the two slots 41a and 41b are positioned between the grooves 31, there is no flow. Rotating the lever 7 through 90° takes the valve between the fully closed and fully open positions. Abutments on the disk 71 engageable with the sleeve nuts 25a define these end positions.

As mentioned above, having the hot and cold water feed to the right chambers 24a and 24b is much more critical in a self-adjusting valve, so if the hookup is backward, this can be corrected simply by disassembling the valve enough to take out and reverse the movable washer 4 on the coupling sleeve 42.

We claim:

1. A valve assembly comprising:

a valve housing having hot- and cold-water inlet ports and a mixed-water outlet port;

a valve disk fixed in the housing, centered on an axis, and having a face formed with respective arcuate hot- and cold-water grooves offset diametrically opposite to each other relative to the axis, each aligned with and receiving flow from the respective inlet port, having circularly arcuate inner and outer edges, being of a predetermined relatively large width between the respective edges, and having centers of curvature at the axis, a central throughgoing outlet opening;

a movable valve disk sitting flatly on the face of the fixed valve disk and formed with a pair of axially throughgoing arcuate openings offset diametrically opposite to each other, being of a narrow width at most equal to half of the large width, being differently radially offset from the axis with one of the arcuate openings lying on the outer edge of one of the grooves and the other arcuate opening lying on the inner edge of the other groove, and having centers of curvature at the axis, the openings and grooves each having an arc length of less than 90°, and a central throughgoing outlet opening aligned with the outlet opening of the fixed disk;

a splitter element in the housing forming a pair of passages each having a pair of ends one of which is at a respective one of the openings of the movable disk;

means including a coupling element pivotal in the housing about the axis for pivoting the movable disk on the fixed disk and thereby restricting flow from the grooves to the respective arcuate openings;

means including a thermostatically controlled valve element positioned between the other ends of the passages and the outlet opening for balancing flow from the passages to the outlet opening in accordance with temperature in the outlet openings.

2. A mixing valve defined in claim 1, further comprising a cartridge housing containing the disks and elements and having a bottom side at which the fixed disk is exposed and a top side, the thermostatically controlled valve element having an axially displaceable control stem projecting axially from the top side of the cartridge housing.

3. The mixing valve defined in claim 2 wherein the coupling element is rotationally fixed to the movable valve disk and has a polygonal-section stem projection axially out of the cartridge housing, the valve further comprising a lever fixed on the stem and projecting nonaxially out of the valve housing.

4. The mixing valve defined in claim 3 wherein the thermostatically controlled valve element comprises a thermostat and an actuating stem projecting axially and on the axis through the stem of the coupling element, the valve element being provided with a spring biasing the actuating stem against the thermostat.

5. The mixing valve defined in claim 4 wherein the splitter element forms a pair of axially spaced valve seats for the valve element.

6. A valve assembly comprising:

a valve housing having hot- and cold-water inlet ports and a mixed-water outlet port;

a valve disk fixed in the housing, centered on an axis, and having a face formed with respective arcuate hot- and cold-water grooves offset diametrically opposite to each other relative to the axis, each aligned with and receiving flow from the respective inlet port, and having centers of curvature at the axis, a central throughgoing outlet opening;

a movable valve disk sitting flatly on the face of the fixed valve disk and formed with a pair of axially throughgoing arcuate openings offset diametrically opposite to each other and having centers of curvature at the axis, the openings and grooves each having an arc length of less than 90°, and a central throughgoing outlet opening aligned with the outlet opening of the fixed disk;

a splitter element in the housing forming a pair of passages each having a pair of ends one of which is at a respective one of the openings of the movable disk;

means including a coupling element pivotal in the housing about the axis for pivoting the movable disk on the fixed disk and thereby restricting flow from the grooves to the respective arcuate openings;

means including a thermostatically controlled valve element positioned between the other ends of the passages and the outlet opening for balancing flow from the passages to the outlet opening in accordance with temperature in the outlet openings;

a cartridge housing containing the disks and elements and having a bottom side at which the fixed disk is exposed and a top side, the thermostatically controlled valve element having an axially displaceable control stem projecting axially from the top side of the cartridge housing;

a temperature-selector mechanism; and bolts securing the cartridge housing in the valve housing and securing the mechanism axially atop the cartridge housing.

7. The mixing valve defined in claim 6 wherein the temperature-selector mechanism has a flange, the bolts including nuts bracing the flange on the cartridge housing.

8. The mixing valve defined in claim 6 wherein the coupling element is rotationally fixed to the movable valve disk and has a polygonal-section stem projecting axially out of the cartridge housing, the valve further comprising a lever fixed on the stem, projecting nonaxially out of the valve housing, and stops angularly fixed on the lever, angularly engageable with the bolts, and limiting angular movement of the lever relative to the valve housing to at most 90°.

9. The mixing valve defined in claim 8 wherein the housing includes a pair of skirts axially flanking the lever.

10. A valve assembly comprising:

a valve housing having hot- and cold-water inlet ports and a mixed-water outlet port;

a valve disk fixed in the housing, centered on an axis, and having a face formed with respective arcuate hot- and cold-water grooves offset diametrically opposite to each other relative to the axis, each aligned with and receiving flow from the respective inlet port, and having centers of curvature at the axis, a central throughgoing outlet opening;

a movable valve disk sitting flatly on the face of the fixed valve disk and formed with a pair of axially throughgoing arcuate openings offset diametrically opposite to each other and having centers of curvature at the axis, the openings and grooves each having an arc length of less than 90°, and a central throughgoing outlet opening aligned with the outlet opening of the fixed disk;

a splitter element in the housing forming a pair of passages each having a pair of ends one of which is at a respective one of the openings of the movable disk, the splitter element including an eccentric sleeve having an eccentric rim bearing on the movable valve disk with one of the openings radially outside the rim and the other opening radially inside the rim;

means including a coupling element pivotal in the housing about the axis for pivoting the movable disk on the fixed disk and thereby restricting flow from the grooves to the respective arcuate openings, the splitter element being symmetrical about a plane including the axis and mountable in the coupling element in either of two 180° offset positions; and means including a thermostatically controlled valve element positioned between the other ends of the passages and the outlet opening for balancing flow from the passages to the outlet opening in accordance with temperature in the outlet openings.

11. The mixing valve defined in claim 10, further comprising a spring pressing the element rim axially against the movable valve disk.

12. The mixing valve defined in claim 11 wherein the spring is a washer having an inner periphery forming a valve seat for the valve element.

13. The mixing valve defined in claim 1 wherein the fixed disk has a lower face opposite the face formed with the grooves and is formed with respective passages opening at the lower face at the inlet ports and also opening into the respective grooves.

14. A valve assembly comprising:

a valve housing having hot- and cold-water inlet ports and a mixed-water outlet port;

a valve disk fixed in the housing, centered on an axis, and having a face formed with respective arcuate hot- and cold-water grooves offset diametrically opposite to each other relative to the axis, each aligned with and receiving flow from the respective inlet port, and having centers of curvature at the axis, a central throughgoing outlet opening;

a movable valve disk sitting flatly on the face of the fixed valve disk and formed with a pair of axially throughgoing arcuate openings offset diametrically opposite to each other and having centers of curvature at the axis, the openings and grooves each having an arc length of less than 90°, and a raised annular collar defining a central throughgoing outlet opening aligned with the outlet opening of the fixed disk and having an edge forming a seat;

a splitter element in the housing forming a pair of passages each having a pair of ends one of which is at a respective one of the openings of the movable disk;

means including a coupling element pivotal in the housing about the axis for pivoting the movable disk on the fixed disk and thereby restricting flow from the grooves to the respective arcuate openings;

means including a thermostatically controlled valve element engageable with the seat formed by the edge and positioned between the other ends of the passages and the outlet opening for balancing flow from the passages to the outlet opening in accordance with temperature in the outlet openings.

15. The mixing valve defined in claim 1 wherein the openings and grooves each have an arc length of about 70°.

\* \* \* \* \*